(12) United States Patent
Kajiyama

(10) Patent No.: US 10,075,637 B2
(45) Date of Patent: Sep. 11, 2018

(54) ELECTRONIC DEVICE AND CONTROL METHOD FOR REDUCING POWER CONSUMPTION

(71) Applicant: CANON KABUSHIKI KAISHA, Tokyo (JP)

(72) Inventor: Hiroyuki Kajiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 15/214,547

(22) Filed: Jul. 20, 2016

(65) Prior Publication Data

US 2017/0034438 A1    Feb. 2, 2017

(30) Foreign Application Priority Data

Jul. 27, 2015  (JP) ................... 2015-148033

(51) Int. Cl.
*H04N 5/225* (2006.01)
*H04N 5/232* (2006.01)
*G06F 17/30* (2006.01)

(52) U.S. Cl.
CPC ..... *H04N 5/23241* (2013.01); *G06F 17/3028* (2013.01)

(58) Field of Classification Search
CPC .................................. H04N 5/23241
USPC ........................................... 348/372
See application file for complete search history.

(56) References Cited

U.S. PATENT DOCUMENTS

| 2007/0036444 | A1* | 2/2007 | Yoshida | ........ G06T 1/00 382/232 |
| 2012/0060124 | A1* | 3/2012 | Allen | ........ G06F 3/0482 715/841 |

FOREIGN PATENT DOCUMENTS

JP          2007-081737 A    3/2007

* cited by examiner

*Primary Examiner* — Usman Khan
(74) *Attorney, Agent, or Firm* — Carter, DeLuca, Farrell & Schmidt LLP

(57) ABSTRACT

An electronic device has a power saving function that reduces an amount of consumed power in response to a non-operating period, in which there are no operations from a user, reaching a predefined amount of time. The electronic device displays a time setting screen for setting a time in a display unit and sets the time in accordance with an operation accepted when the time setting screen is being displayed in the display unit, and carries out control such that an amount of time until the power saving function is executed is extended to be longer when the time setting screen is being displayed than when the time setting screen is not being displayed.

16 Claims, 10 Drawing Sheets

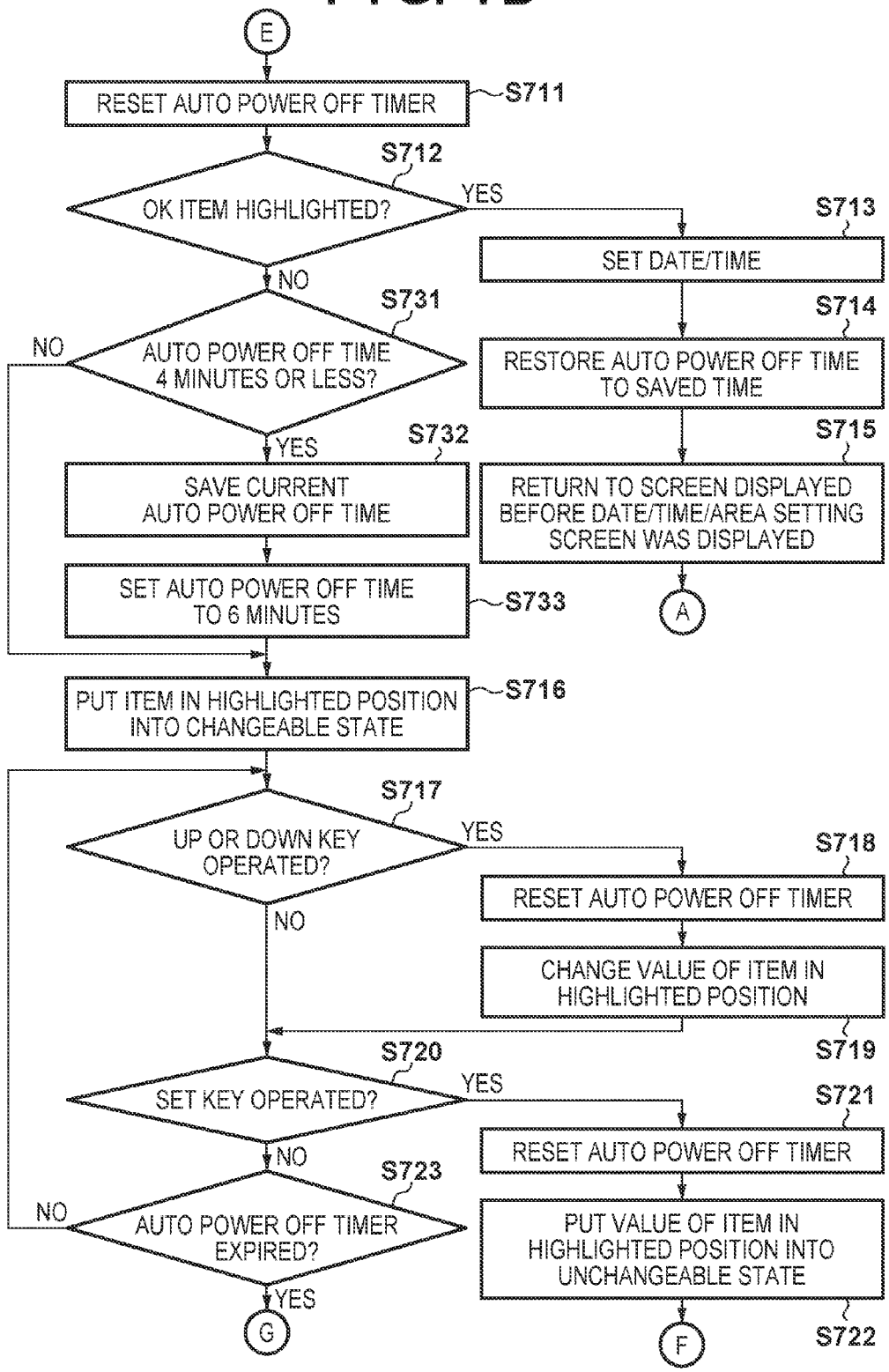

ELECTRONIC DEVICE AND CONTROL METHOD FOR REDUCING POWER CONSUMPTION

BACKGROUND OF THE INVENTION

Field of the Invention

The present invention relates to electronic devices, and particularly relates to control for saving power when setting a time.

Description of the Related Art

Some conventional electronic devices such as digital cameras have power saving functions, such as an auto power off function. This type of electronic device saves power by automatically powering off, turning off a display unit, or the like in the case where no operations have been made for a predefined amount of time. Such power saving functions make it possible to extend the battery life of the electronic device (see Japanese Patent Laid-Open No. 2007-081737).

However, with an electronic device having such a power saving function, there are cases where the power saving function such as auto power off function goes into effect while a user is setting a date/time. For example, to accurately set the time in an electronic device, the user sets a desired time in a time setting mode in which time measurement is stopped, waits until the desired time is actually reached, and then confirms the set time (starts the time measurement). If the amount of time after which the power saving function goes into effect is set to be short, it is possible that the power saving function will cause the electronic device to turn off while the user is waiting for the desired time at which s/he wishes to confirm the setting. This results in the operations made up until that point being lost, which makes it necessary to redo the operations (the time setting operations) once again from the beginning.

SUMMARY OF THE INVENTION

An aspect of the present invention provides an electronic device and a control method thereof that reduce the likelihood of a power saving function going into effect against a user's intentions when setting a time.

According to one aspect of the present invention, there is provided an electronic device comprising: a power saving unit configured to execute a power saving function that reduces an amount of consumed power in response to a non-operating period, in which there are no operations from a user, reaching a predefined amount of time; a setting unit configured to set a time in accordance with an operation accepted when a time setting screen for setting a time is being displayed in a display unit; and a control unit configured to carry out control such that an amount of time until the power saving unit executes the power saving function is extended to be longer when the time setting screen is being displayed than when the time setting screen is not being displayed.

According to another aspect of the present invention, there is provided an electronic device comprising: a power saving unit configured to execute a power saving function that reduces an amount of consumed power in response to a non-operating period, in which there are no operations from a user, reaching a predefined amount of time; a setting unit configured to set a time in accordance with an operation accepted when a time setting screen is being displayed in a display unit; and a control unit configured to carry out control such that the power saving function is not executed when the time setting screen is being displayed even in the case where the non-operating period has reached the predefined amount of time.

According to another aspect of the present invention, there is provided a method of controlling an electronic device, the method comprising: executing a power saving function that reduces an amount of consumed power in response to a non-operating period, in which there are no operations from a user, reaching a predefined amount of time; displaying a time setting screen for setting a time in a display unit; setting a time in accordance with an operation accepted when the time setting screen is being displayed in the display unit; and carrying out control such that an amount of time until the power saving function is executed is extended to be longer when the time setting screen is being displayed than when the time setting screen is not being displayed.

According to another aspect of the present invention, there is provided a method of controlling an electronic device, the method comprising: executing a power saving function that reduces an amount of consumed power in response to a non-operating period, in which there are no operations from a user, reaching a predefined amount of time; displaying a time setting screen in a display unit; setting a time in accordance with an operation accepted when the time setting screen is being displayed in the display unit; and carrying out control such that the power saving function is not executed when the time setting screen is being displayed even in the case where the non-operating period has reached the predefined amount of time.

According to another aspect of the present invention, there is provided an electronic device comprising: a control unit configured to carry out control such that a display made in a display unit is turned off in response to a non-operating period, in which there are no operations from a user, reaching a predefined amount of time; and a setting unit configured to set a time in accordance with an operation accepted when a time setting screen for setting a time is being displayed in the display unit and, wherein the control unit carries out control such that an amount of time until the display in the display unit is turned off is extended to be longer when the time setting screen is being displayed than when the time setting screen is not being displayed.

According to another aspect of the present invention, there is provided a method of controlling an electronic device, the method comprising: carrying out control such that a display made in a display unit is turned off in response to a non-operating period, in which there are no operations from a user, reaching a predefined amount of time; displaying a time setting screen for setting a time in the display unit; setting a time in accordance with an operation accepted when the time setting screen is being displayed in the display unit; and carrying out control such that an amount of time until the display in the display unit is turned off is extended to be longer when the time setting screen is being displayed than when the time setting screen is not being displayed.

According to another aspect of the present invention, there is provided an electronic device comprising: a control unit configured to carry out control such that a display made in a display unit is turned off in response to a non-operating period, in which there are no operations from a user, reaching a predefined amount of time; and a setting unit configured to set a time in accordance with an operation accepted when a time setting screen for setting a time is being displayed in the display unit, wherein the control unit is configured to carry out control such that an amount of time until the display in the display unit is turned off in response to no operations being made before an operation for confirming the time setting is made when the time setting screen is being displayed is longer than the predefined amount of time until the display in the display unit is turned off after the operation for confirming has been made.

According to another aspect of the present invention, there is provided a method of controlling an electronic device, the method comprising: carrying out control such that a display made in a display unit is turned off in response to a non-operating period, in which there are no operations from a user, reaching a predefined amount of time; displaying a time setting screen for setting a time in the display unit; setting a time in accordance with an operation accepted when the time setting screen is being displayed in the display unit; and carrying out control such that an amount of time until the display in the display unit is turned off in response to no operations being made before an operation for confirming the time setting is made when the time setting screen is being displayed is longer than the predefined amount of time until the display in the display unit is turned off after the operation for confirming has been made.

Further features of the present invention will become apparent from the following description of exemplary embodiments with reference to the attached drawings.

BRIEF DESCRIPTION OF THE DRAWINGS

FIGS. 7A and 7B are flowcharts illustrating a process for extending an auto power off time during date/time/area settings.

DESCRIPTION OF THE EMBODIMENTS

Hereinafter, preferred embodiments of the present invention will be described with reference to the drawings.

First Embodiment

Figure 1A:
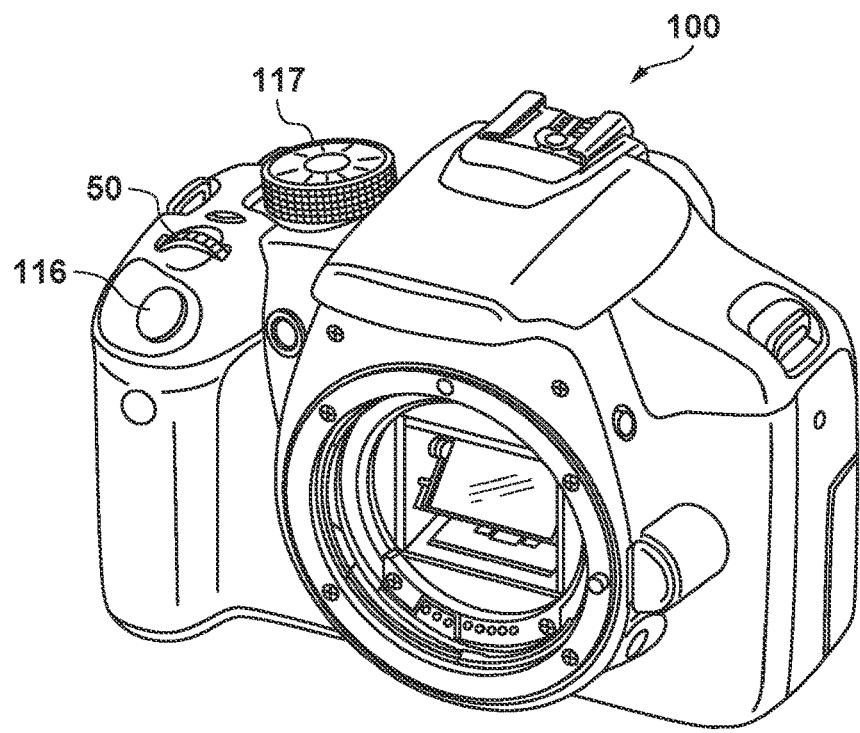
FIGS. 1A and 1B are external views of a digital camera according to an embodiment.
Figure 1B:
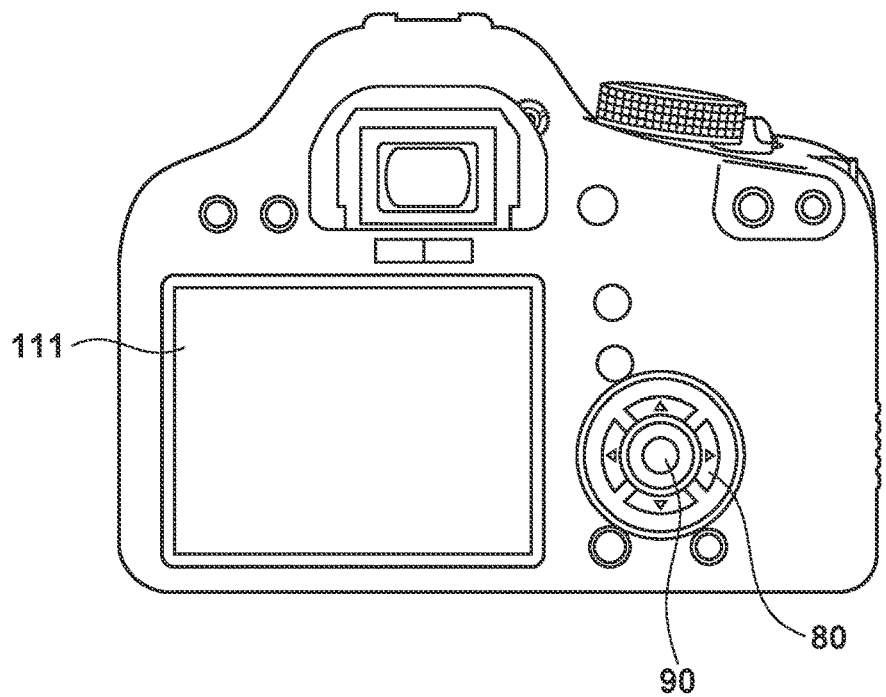

FIGS. 1A and 1B are external views of a digital camera serving as an example of an electronic device according to the present invention. A display unit 111 includes a liquid-crystal display device (LCD), for example, and displays images, various types of information, and the like. A shutter button 116 is an operation member for making a shooting instruction. A mode dial 117 is an operation member for switching among various types of modes. A main dial 50, a directional key 80, and a SET key 90 are operation members for accepting operations from a user.

Figure 2:
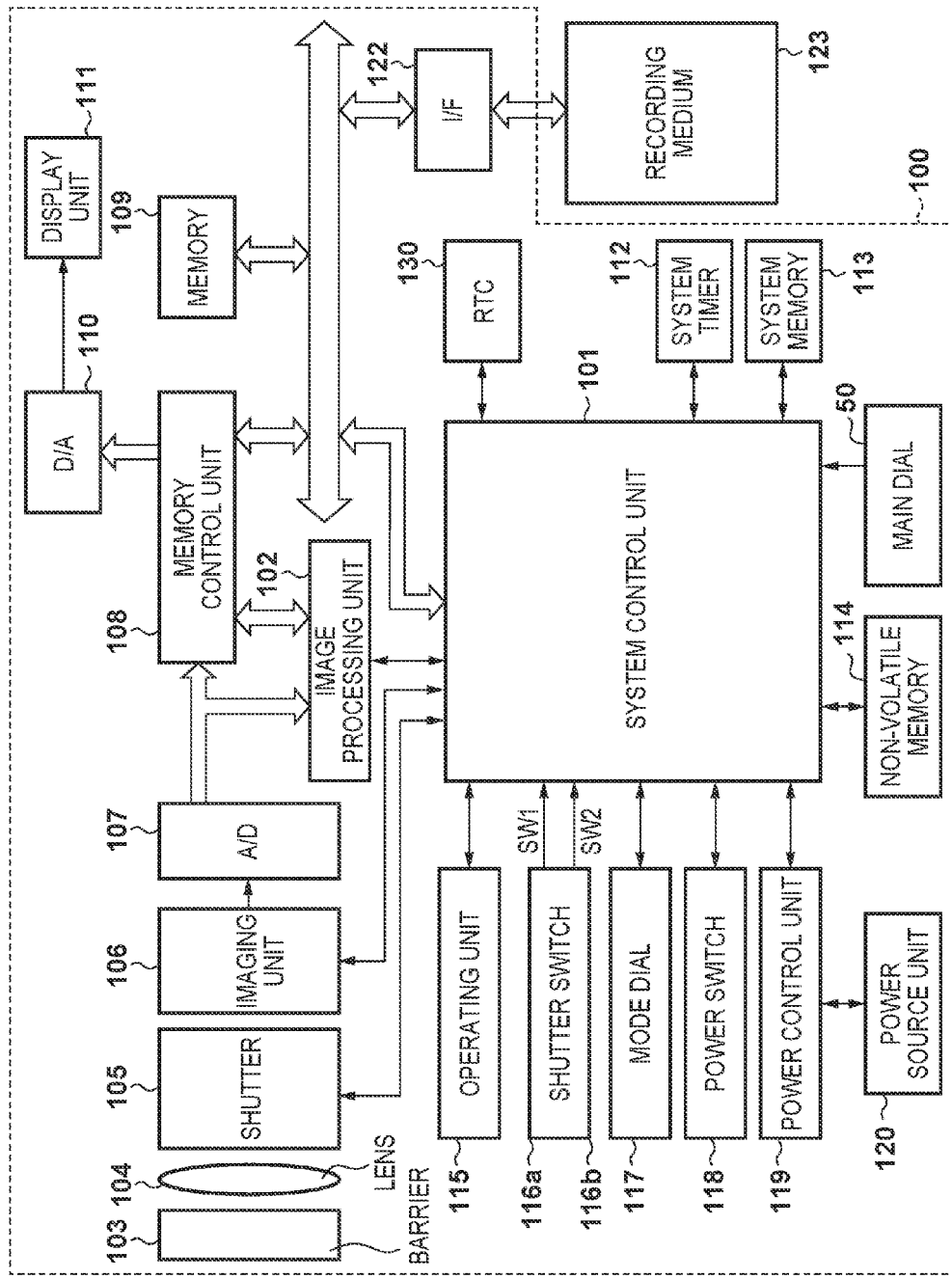
FIG. 2 is a block diagram illustrating the system configuration of a digital camera according to an embodiment.

FIG. 2 is a block diagram illustrating an example of the system configuration of a digital camera 100 according to the present embodiment. In FIG. 2, an imaging lens 104 corresponds to a lens group including a zoom lens and a focus lens. A shutter 105 is a shutter having an aperture function. An imaging unit 106 includes an image sensor constituted by a CCD, a CMOS element, or the like that converts an optical image into an electrical signal. An A/D converter 107 converts analog signals into digital signals. The A/D converter 107 converts analog signals output from the imaging unit 106 into digital signals. A barrier 103 prevents an imaging system of the digital camera 100 including the imaging lens 104, the shutter 105, and the imaging unit 106 from being soiled or damaged by covering the imaging system including the imaging lens 104.

An image processing unit 102 carries out resizing processing such as pixel interpolation and reduction, color conversion processing, and the like on data from the A/D converter 107 or data from a memory control unit 108. The image processing unit 102 also performs predefined computational processing using captured image data, and a system control unit 101 performs exposure control and focus control based on results obtained from these computations. A TTL (through-the-lens) AF (autofocus) process, an AE (automatic exposure) process, and an EF (flash pre-emission) process are carried out thereby. The image processing unit 102 also performs predefined computations using the captured image data, performing a TTL AWB (auto white balance) process on the basis of the results thereof.

Data output from the A/D converter 107 is written directly into a memory 109 through the image processing unit 102 and the memory control unit 108, or through the memory control unit 108. The memory 109 stores the image data obtained by the imaging unit 106 and converted into digital data by the A/D converter 107, image data for display in the display unit 111, and the like. The memory 109 has a storage capacity sufficient to store a predefined number of still images, a predefined time's worth of moving pictures and audio, and so on.

The memory 109 also functions as an image display memory (a video memory). A D/A converter 110 converts data for image display, stored in the memory 109, into an analog signal and supplies the analog signal to the display unit 111. Image data for display written into the memory 109 thus displayed by the display unit 111 via the D/A converter 110 in this manner. The display unit 111 carries out a display in the display device, which is an LCD or the like, based on the analog signal from the D/A converter 110. By using the D/A converter 110 to convert the digital signals A/D converted by the A/D converter 107 and stored in the memory 109 into analog signals and then sequentially transferring and displaying those signals in the display unit 111, the display unit 111 functions as an electronic viewfinder and displays a through-the-lens image.

A non-volatile memory 114 is a memory that can be recorded to and erased electrically, and is constituted by, for example, an EEPROM or the like. Operational constants, programs, and so on of the system control unit 101 are stored in the non-volatile memory 114. Here, "programs" refers to programs for executing the various flowcharts according to the present embodiment, which will be described later. The system control unit 101 controls the entire digital camera 100. The respective processes according to the present embodiment, mentioned later, are realized by executing programs recorded in the non-volatile memory 114 mentioned above. A system memory 113 is constituted of a RAM or the like, and operational constants and variables of the system control unit 101, programs read out from the non-volatile memory 114, and so on are loaded into the system memory 113. The system control unit 101 also carries out display control by controlling the memory 109, the D/A converter 110, the display unit 111, and so on.

An RTC (real time clock) 130 measures the current date/time (days, hours, minutes, and seconds) in units of seconds. A system timer 112 is a time measurement unit that measures times used in various types of control, measures the time of an internal calendar and clock, and so on. The mode dial 117, a first shutter switch 116a, and a second shutter switch 116b are operation units for inputting various types of operating instructions to the system control unit 101.

The mode dial 117 switches an operating mode of the system control unit 101 among a still image recording mode, a moving picture recording mode, and so on. "Still image recording mode" includes an auto shooting mode, an auto scene judgment mode, a manual mode, various types of scene modes having shooting settings for each type of shot scene, a program AE mode, a custom mode, and so on. The mode dial 117 can switch the operating mode directly to one of these modes included in the still image shooting mode. Alternatively, the mode switch may be carried out by first switching to the still image shooting mode using the mode dial 117 and then using another operation member to switch to one of the modes included in the still image shooting mode. Likewise, the moving picture shooting mode may also include a plurality of modes.

The first shutter switch 116a switches on partway through the manipulation of the shutter button 116 provided in the digital camera 100, or in other words, when the button is depressed halfway (a shooting preparation instruction), and produces a first shutter switch signal SW1. Operations such as AF (autofocus) processes, AE (automatic exposure) processes, AWB (auto white balance) processes, and EF (flash pre-emission) processes are started by the first shutter switch signal SW1. The second shutter switch 116b turns on when the shutter button 116 is completely manipulated, or in other words, is fully depressed (a shooting instruction), and produces a second shutter switch signal SW2. The system control unit 101 commences a series of shooting processes, from reading out signals from the imaging unit 106 to writing image data into a recording medium 123, in response to the second shutter switch signal SW2. At this time, the system timer 112 refers to the calendar and clock and adds a date and time (an imaging date/time) to the captured image.

Functions relevant for different situations are assigned to operation members in an operating unit 115, which then act as various types of function buttons, by making an operation for selecting various types of function icons displayed in the display unit 111. An end button, a return button, a next image button, a jump button, a sort button, an attribute change button, and so on are examples of the function buttons. For example, a menu screen in which various types of settings can be made is displayed in the display unit 111 when a menu button is pressed. A user can make various types of settings intuitively using the menu screen displayed in the display unit 111, the four directional buttons corresponding to the directional key 80, the SET key 90, and so on.

The main dial 50 is an operation member that can be rotationally manipulated, and is used along with the directional buttons when specifying items to be selected and so on. When the main dial 50 is rotationally manipulated, an electrical pulse signal is produced in accordance with the amount of manipulation, and the system control unit 101 executes various types of control on the basis of that pulse signal. An angle to which the main dial 50 has been rotationally manipulated, a number of revolutions, and so on can be determined on the basis of this pulse signal. Note that the main dial 50 may be any kind of operation member as long as the member is capable of detecting rotational manipulation. For example, the main dial 50 may be a dial-type operation member that produces a pulse signal upon the main dial 50 itself rotating in accordance with a rotational manipulation made by a user. An operation member constituted of a touch sensor, where the main dial 50 itself does not rotate but rotational movement of the user's finger on the main dial 50 is detected (what is known as a "touch wheel") may be employed instead.

A power control unit 119 is constituted by a battery detection circuit, a DC-DC converter, switch circuits for switching the blocks through which power passes, and so on, and detects whether or not a battery is connected, the type of the battery, the remaining battery power, and so on. The power control unit 119 also controls the DC-DC converter based on the detection results and instructions from the system control unit 101, and supplies a necessary voltage for a necessary period to the various units, including the recording medium 123. A power switch 118 communicates power on/off operations to the system control unit 101.

A power source unit 120 is a primary battery such as an alkali battery, a lithium battery, or the like, a secondary battery such as a NiCd battery, a NiMH battery, a Li battery, or the like, an AC adapter, and so on. A recording medium I/F 122 is an interface for the recording medium 123 such as a memory card, a hard disk, or the like. The recording medium 123 is a recording medium for recording shot images, such as a memory card or the like, and is constituted by a semiconductor memory, a magnetic disk, or the like.

Figure 8:
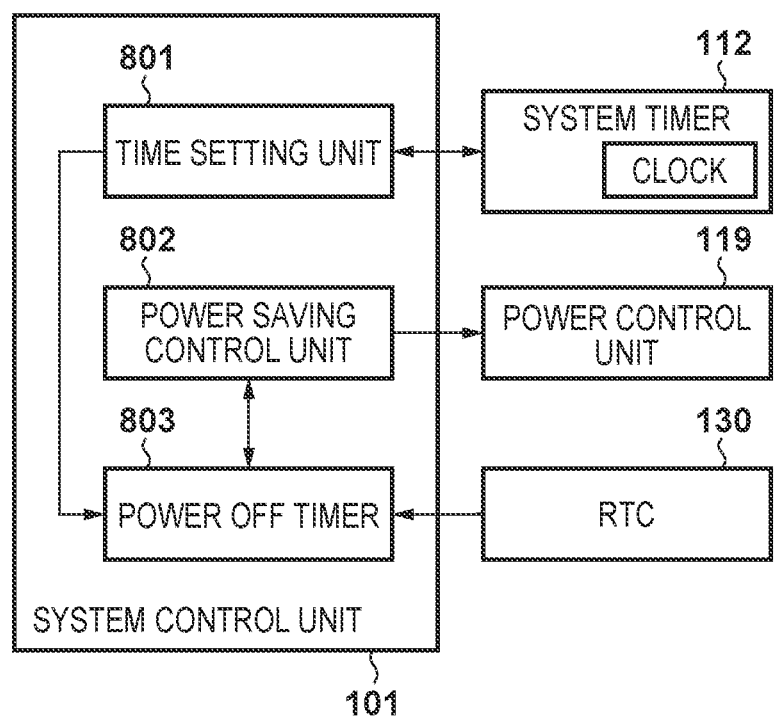
FIG. 8 is a diagram illustrating function blocks related to date/time settings and a power saving function in a system control unit.

FIG. 8 is a block diagram illustrating the functional configuration related to a date/time setting function and a power saving function in the digital camera 100 configured as described above. In FIG. 8, a time setting unit 801 of the operating unit 115 sets the calendar (year, month, and day), sets the time of the clock included in the system timer 112, and so on in response to operations accepted through the display of the date/time/area setting screen, which serves as a time setting screen described later with reference to FIGS. 4A to 4C. A power saving control unit 802 executes a power saving function that reduces the power consumed by the digital camera 100 by controlling the supply of power by the power control unit 119 in response to a non-operating period, in which no operations have been made by the user, reaching a first predefined time. The first predefined time can be set (to one minute, two minutes, four minutes, eight minutes, 15 minutes, or 30 minutes, for example) by the user using a setting screen such as that illustrated in FIG. 3. The power saving control unit 802 executes the power saving function in the case where a power-off timer 803 that is reset each time a user operation is detected indicates that the first predefined time has passed (that is, in the case where the power-off timer set to the first predefined time expires). The time setting unit 801 controls the power saving control unit to extend the time until the power saving function is executed so as to be longer in the case where the time setting screen is being displayed than in the case where the time setting screen is not being displayed by, for example, changing the setting of the power-off timer 803. To rephrase, control is carried out such that while the time setting screen is being displayed, the power saving function is not executed even when the non-operating period reaches the first predefined time.

Figure 3:
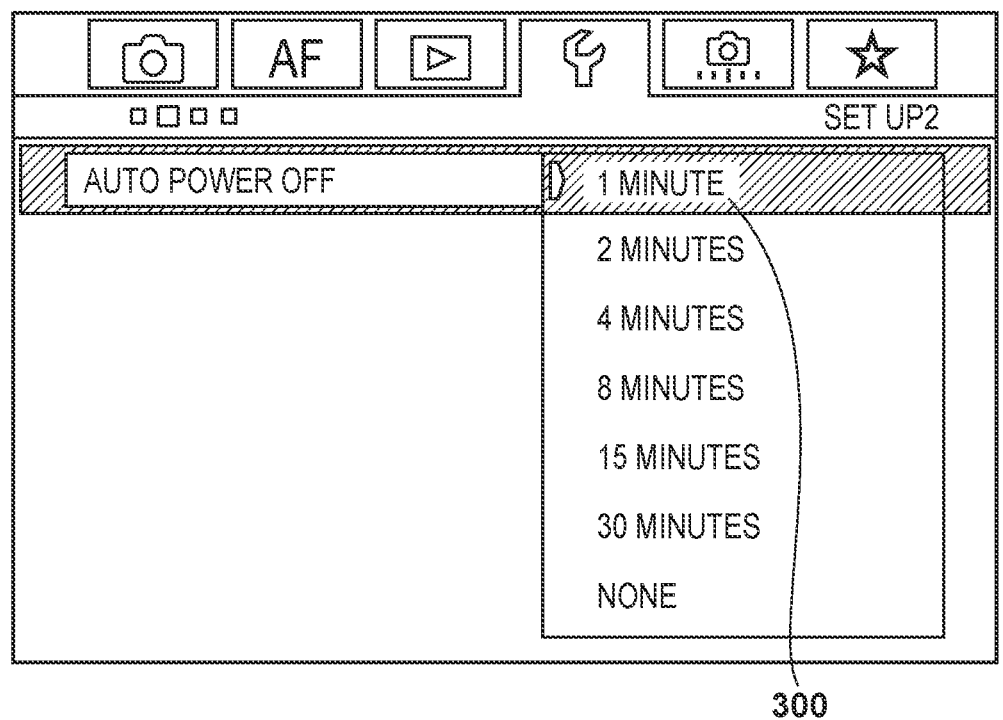
FIG. 3 is a diagram illustrating a display example of an auto power off time setting screen according to an embodiment.

Next, operations of the first embodiment of the present invention will be described with reference to FIGS. 3 to 5. FIG. 3 illustrates a screen for setting an amount of time until the auto power off function goes into effect (an auto power off time). This screen is displayed by selecting, from a settings menu screen for making various types of settings in the digital camera 100, a menu for setting the auto power off time. The user can move a cursor 300 indicating a currently-selected item by pressing the up and down keys of the directional key 80. The currently-selected item (the item where the cursor 300 is located) is displayed in an identifiable manner using an emphasized display, by displaying the item in a highlighted manner (indicating the selected state) as indicated in FIG. 3. For example, one minute, two minutes, four minutes, eight minutes, 15 minutes, 30 minutes, or none can be selected as auto power off times. The user can set a desired auto power off time by, for example, manipulating the up and down keys of the directional key 80 to select a desired option for a desired auto power off time and then pressing the SET key 90. The set auto power off time is recorded into the non-volatile memory 114.

In the present embodiment, the system control unit 101 automatically turns the digital camera off to save power in the case where the user does not make any operations beyond the auto power off time set in this manner. For example, when the auto power off time is set to one minute, the system control unit 101 turns the digital camera off when the user has not made any operations for more than one minute. Meanwhile, in the case where the auto power off time is set to "none", the power is not turned off through the auto power off function even in the case where a state in which the user has not made any operations continues indefinitely. In the present embodiment, in the case where the user has not made any settings in the auto power off time setting screen illustrated in FIG. 3, a default (initial setting) auto power off time is set to one minute.

Figure 4A:
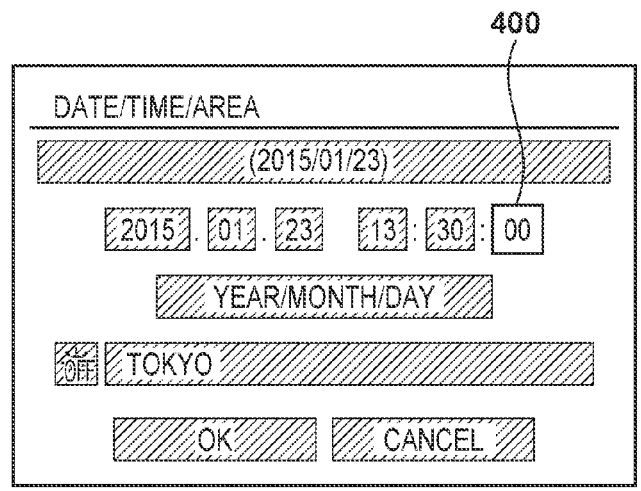
FIGS. 4A, 4B, and 4C are diagrams illustrating display examples of a date/time/area setting screen according to an embodiment.
Figure 4B:
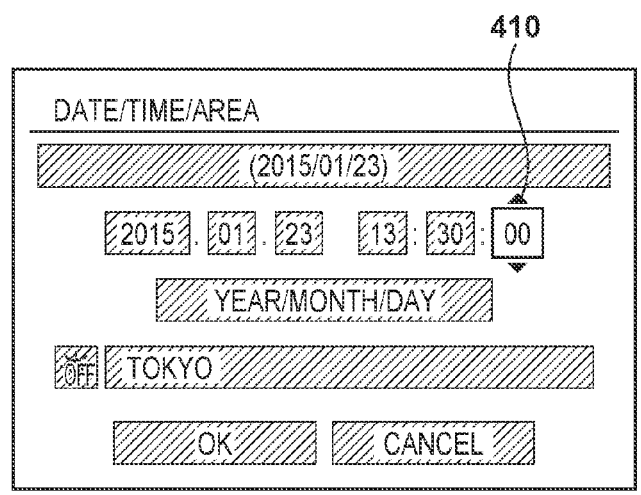
Figure 4C:
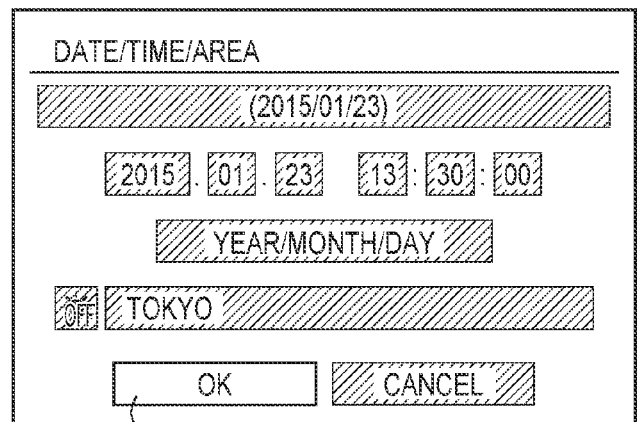

FIGS. 4A to 4C illustrate the date/time/area setting screen for setting the date (year, month, and day), the time (hours, minutes, and seconds), and an area. By selecting a location such as Tokyo, London, or the like in the area setting, the date and time are automatically changed to the date and time at that area. The example in FIG. 4A illustrates a state in which the time (seconds) is selected in a highlighted manner using a highlight frame 400. The example in FIG. 4B illustrates a state in which the time (seconds) can be changed, with up and down arrow icons 410 being displayed. In this state, the user can change the value of the currently-selected item by pressing the up and down keys of the directional key 80. The example in FIG. 4C indicates a state in which an OK button 420 is selected and displayed in a highlighted manner. At this time, the user confirms the date (year, month, day), time (hours, minutes, seconds), and area settings by pressing the SET key 90. The system control unit 101 sets the confirmed date (year, month, day) and time (hours, minutes, seconds) in the RTC 130 and causes the clock realized by the RTC 130 to start measuring time from the time set by the user. Although the present embodiment illustrates a date/time/area setting screen, the date and area settings are not absolutely necessary, and a setting screen having at least a function for setting the time (a time setting screen) is sufficient.

In the present embodiment, when a date/time/area setting screen such as that illustrated in FIGS. 4A to 4C is displayed in the display unit 111, the system control unit 101 loads the set auto power off time from the non-volatile memory 114. Then, in the case where the set auto power off time is set to one minute, two minutes, or four minutes, the system control unit 101 changes the setting of the auto power off time to six minutes. The longer the auto power off time setting is, the more the battery is depleted, and thus the auto power off time is changed to a setting considered sufficient for the user to set the time. This makes it possible to reduce the likelihood of the auto power off function going into effect and turning the power off against the user's intentions while the user is waiting for the desired time s/he wishes to set. Additionally, in the case where the system control unit 101 has displayed a screen aside from the date/time/area setting screen in the display unit 111 thereafter, the system control unit 101 returns the auto power off time to the setting in effect before the date/time/area setting screen was displayed. This makes it possible to conserve power without sacrificing convenience for the user.

In the present embodiment, the date/time/area setting screen is displayed in the following two cases:

when the user manipulates the operating unit 115 to select the date/time/area settings menu from the menu screen and displays the date/time/area setting screen in the display unit 111; and when the date/time/area setting screen is displayed in the display unit 111 upon the digital camera being turned on in a state where no date/time/area settings have yet been made.

For example, a situation where the user has not made the date/time/area settings even once after purchasing the digital camera can be considered as a state in which the date/time/area settings have not yet been made in the digital camera. If an image is shot in a state where the date/time/area settings have not been made, imaging date and time information will not be added to the shot image, which may reduce the convenience for the user when handling the images s/he has shot (for example, images cannot be searched for using the imaging date and time). To prevent such a situation, when the power is turned on in a state where the date/time/area settings have not yet been made, the system control unit 101 first displays the date/time/area setting screen in the display unit 111 and prompts the user to set the date/time/area. Note that it is possible for this screen to be canceled and skipped, and to move immediately to a shooting standby screen, in response to a user operation.

As described thus far, the date/time/area setting screen is displayed when the power is turned on in a state where the date/time/area settings have not yet been made, but even in this case, the system control unit 101 changes the setting of the auto power off time to six minutes. As described earlier, in the present embodiment, the default auto power off time is set to one minute in the case where the user has not carried out an operation for setting the auto power off time. Normally, the default auto power off time is set to a comparatively short amount of time in order to save power. Accordingly, when the user turns the power on and consults an instruction manual or the like to carry out initial settings, it is possible that the power will be turned off by the auto power off function in the date/time/area setting screen during that time, which reduces the convenience. Accordingly, the setting of the auto power off time is extended even while the date/time/area setting screen is being displayed when the digital camera is turned on in a state where the date/time/area settings have not yet been made, which reduces the likelihood of the power being turned off unintentionally.

Figure 5:
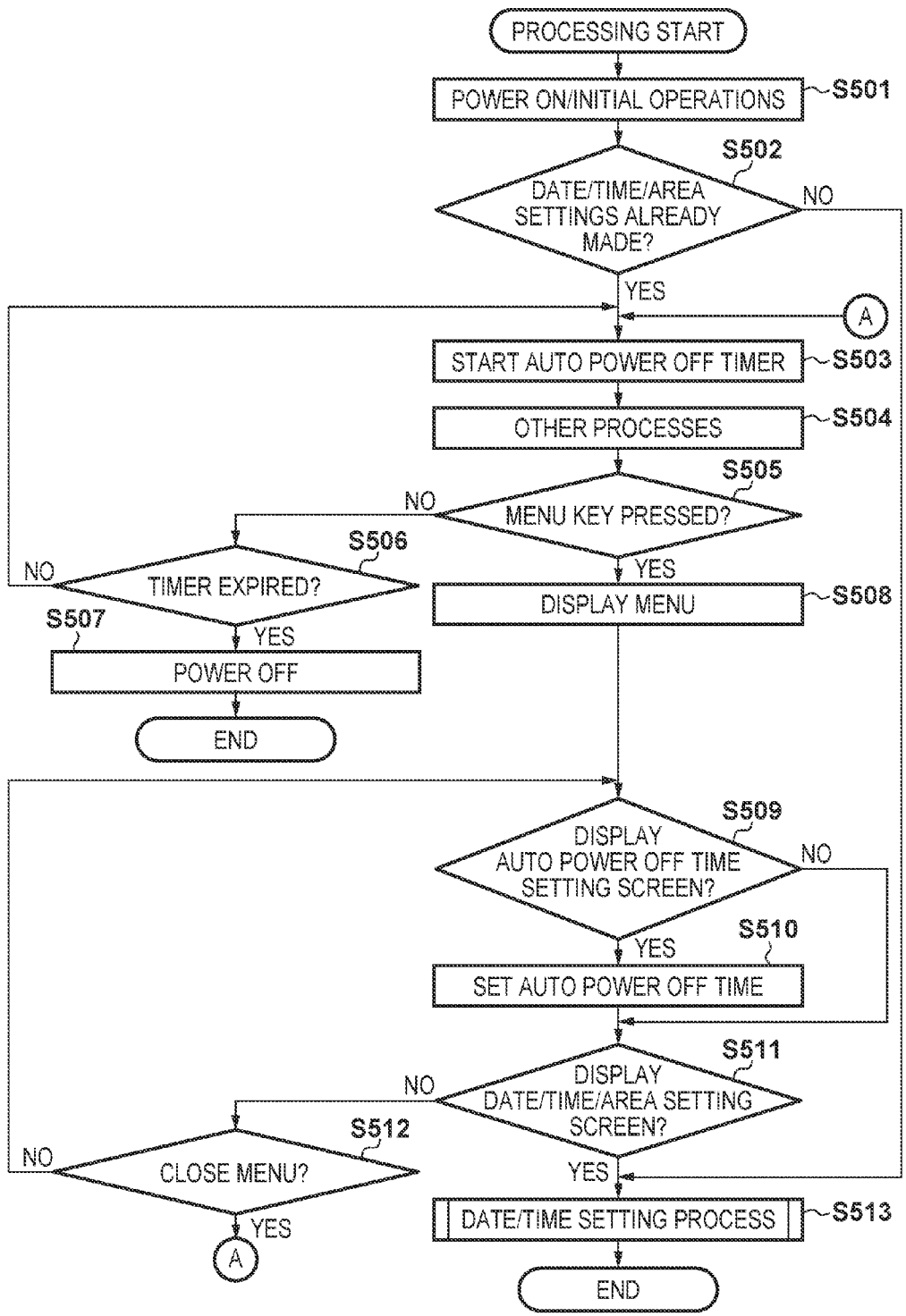
FIG. 5 is a flowchart illustrating processing carried out up until the start of date/time/area settings.

FIG. 5 is a flowchart illustrating the flow of processing carried out up until the display of the date/time/area setting screen. This processing is realized by the system control unit 101 loading a program recorded in the non-volatile memory 114 into the system memory 113 and executing the program.

In S501, the system control unit 101 carries out various types of initial operations related to the digital camera being turned on. In S502, the system control unit 101 determines whether or not the date/time/area are set. In the case where it is determined that the date/time/area are not set, the process advances to S513, where a date/time setting process is executed. In other words, in the case where the power is turned on in a state where the time is not set, a time setting screen such as that illustrated in FIGS. 4A to 4C is automatically displayed. On the other hand, in the case where it is determined that the date/time/area are already set, the process advances to S503.

In S503, the system control unit 101 starts the timer for the auto power off function, and starts measuring the set auto power off time. In S504, the system control unit 101 carries out various types of processes for the digital camera 100. These processes are, for example, processes for standing by for shooting, shooting, various types of shooting settings, and so on in a shooting mode, processes for playing back images in a playback mode, or the like, but details thereof will be omitted. In the case where some sort of operation has been accepted from the user at this time, the auto power off timer started in S503 is reset and the measurement of time is restarted.

In S505, the system control unit 101 (the power saving control unit 802) determines whether or not the MENU key in the operating unit 115 has been pressed. The process advances to S506 in the case where the MENU key has not been pressed, and advances to S508 in the case where the MENU key has been pressed. In S506, the system control unit 101 (the power saving control unit 802) determines whether or not the auto power off timer has expired. The process advances to S507 in the case where the auto power off timer has expired, and returns to S503 in the case where the timer has not expired. In S507, the system control unit 101 (the power saving control unit 802) turns the digital camera 100 off (an auto power off process) in response to the auto power off timer expiring (that is, in response to the set auto power off time elapsing without any operations being made).

In S508, the system control unit 101 displays the menu screen in the display unit 111. In S509, the system control unit 101 determines whether or not a menu item for displaying the auto power off time setting screen has been selected from among the menu items displayed in the menu screen and there has been an instruction to transition to the auto power off time setting screen. The process advances to S510 in the case where there has been an instruction to transition to the auto power off time setting screen, and advances to S511 in the case where there has been no such instruction. In S510, the system control unit 101 displays the auto power off time setting screen described earlier with reference to FIG. 3 in the display unit 111. The auto power off time is then set to one minute, two minutes, four minutes, eight minutes, 15 minutes, 30 minutes, or none in response to a user operation, as described earlier using FIG. 3. The system control unit 101 then stores the set auto power off time in the non-volatile memory 114.

In S511, the system control unit 101 determines whether or not a menu item for displaying the date/time/area setting screen has been selected from among the menu items displayed in the menu screen and there has been an instruction to transition to the date/time/area setting screen. In the case where there has been an instruction to transition to the date/time/area setting screen, the process advances to S513, where the system control unit 101 carries out the date/time setting process. In the case where there is no instruction to transition to the date/time/area setting screen in S511, the process advances to S512. Note that the date/time setting process of S513 will be described later using FIGS. 6A and 6B.

In S512, the system control unit 101 determines whether or not there has been an operation for closing the menu screen. In the case where there has been an operation for closing the menu screen, the system control unit 101 closes the menu screen, and the process returns to S503. On the other hand, in the case where there is no operation for closing the menu screen, the process returns to S509, and the aforementioned processing is repeated. Note that other menu items aside from the auto power off time and the date/time settings are present in the menu screen, but descriptions thereof will be omitted here.

Figure 6A:
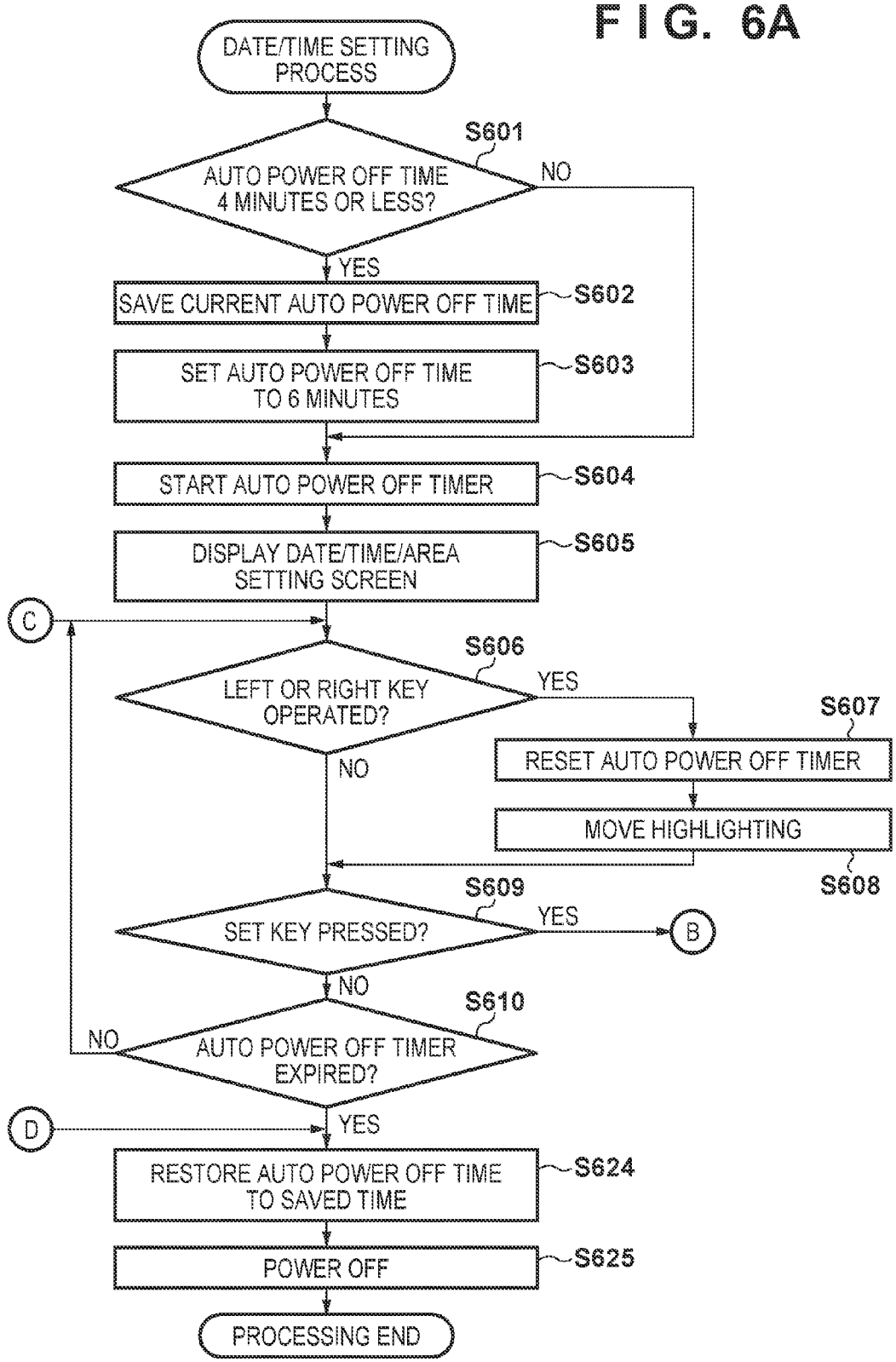
FIGS. 6A and 6B are flowcharts illustrating a process for extending an auto power off time during date/time/area settings.
Figure 6B:
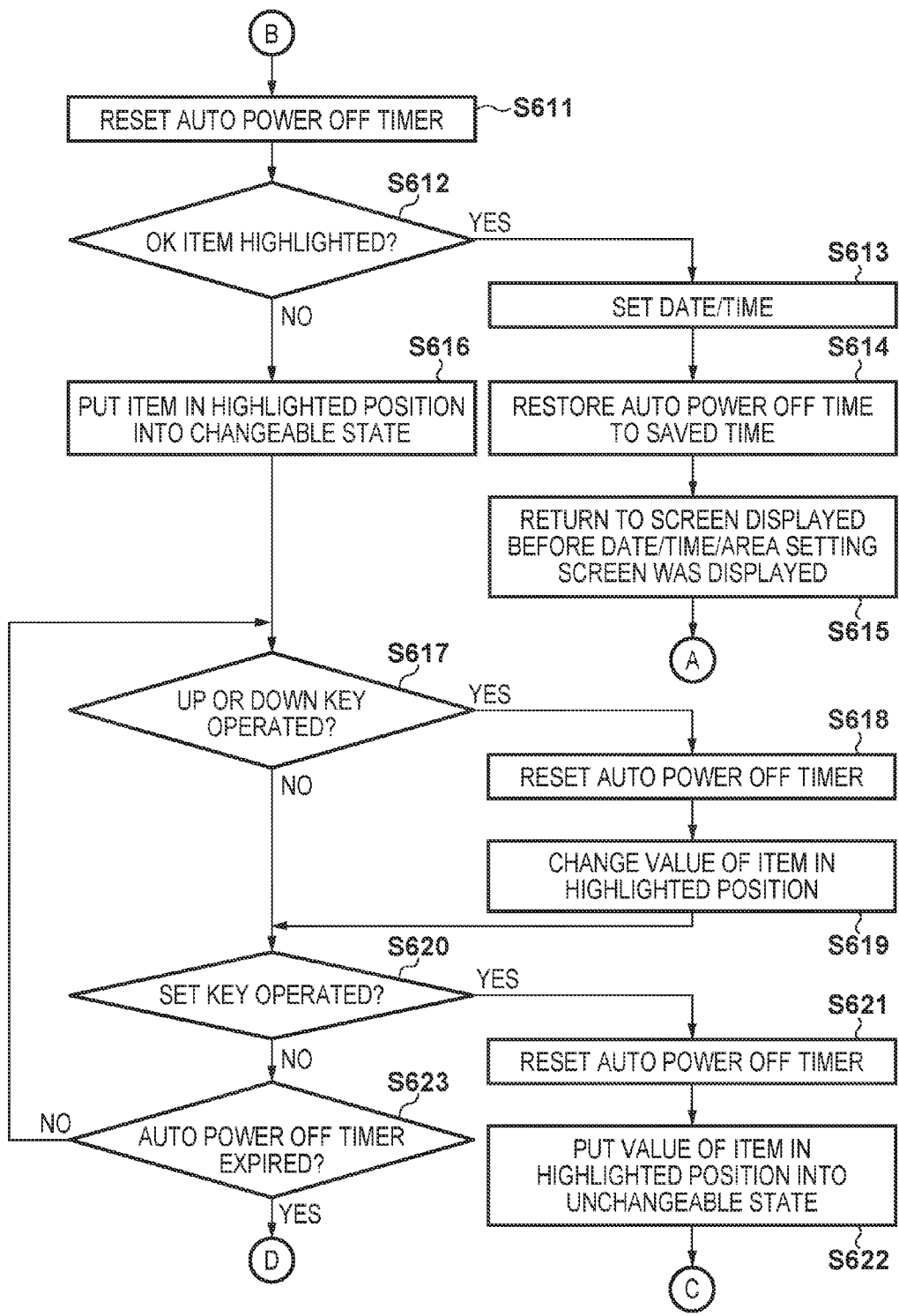

FIGS. 6A and 6B are flowcharts illustrating, in detail, the date/time setting process of S513 indicated in FIG. 5. This processing is realized by the system control unit 101 loading a program recorded in the non-volatile memory 114 into the system memory 113 and executing the function of the time setting unit 801. First, in S601, the system control unit 101 determines whether or not the auto power off time is currently set to four minutes or less. The process advances to S602 in the case where the auto power off time is four minutes or less, and moves to S604 in the case where the auto power off time is more than four minutes.

In S602, the system control unit 101 saves the auto power off time currently set in the system memory 113. In S603, the system control unit 101 sets the auto power off time to six minutes (extends the auto power off time). In S604, the system control unit 101 starts the auto power off timer. In S605, the system control unit 101 displays a date/time/area setting screen, such as that illustrated in FIGS. 4A to 4C, in the display unit 111.

In S606, the system control unit 101 determines whether or not the left or right key of the directional key 80 has been pressed. The process advances to S607 in the case where it is determined that the left or right key has been pressed, and advances to S609 in the case where it is determined that the left or right key has not been pressed. In S607, the system control unit 101 resets the auto power off timer and starts the time measurement again. In S608, the system control unit 101 moves the highlighting (the selection frame) in the direction corresponding to the left or right key, of the directional key 80, that has been pressed. In S609, the system control unit 101 determines whether or not the SET key 90 has been pressed; the process advances to S611 in the case where the SET key 90 has been pressed, and advances to S610 in the case where the SET key 90 has not been pressed. In S610, the system control unit 101 (the power saving control unit 802) determines whether or not the auto power off timer has expired. The process advances to S624 in the case where the auto power off timer has expired, and returns to S606 in the case where the timer has not expired.

In S611, the system control unit 101 (the power saving control unit 802) resets the auto power off timer and starts the time measurement again. In S612, the system control unit 101 determines whether or not the highlighting is on the OK item in the date/time/area setting screen (FIGS. 4A to 4C) when the SET key 90 is pressed in S609. The process advances to S613 in the case where the highlighting is on the OK item, and advances to S616 in the case where the highlighting is not on the OK item. In S613, the system control unit 101 sets the date and time in the RTC 130. In this manner, the time measurement of the clock is started from the time set by the user in the date/time/area setting screen (the time setting screen). In S614, the system control unit

101 restores the auto power off time to the setting saved in the system memory 113 in S602. In S615, the system control unit 101 returns to the screen displayed before the date/time/area setting screen was displayed, and the process advances to S503 in FIG. 5. In this manner, the auto power off time returns to the pre-extension time in accordance with the display of the time setting screen ending.

S616 is executed in the case where the item highlighted (selected) when the SET key 90 was pressed in S609 is a settable item such as the year, month, day, hour, minute, second, or the like. Accordingly, in S616, the system control unit 101 changes the display state of the item in the highlighted position from a non-settable state (for example, the display state where the highlight frame 400 is located in FIG. 4A) to a changeable state (for example, the display state in which the up and down arrow icons have been added, as indicated in FIG. 4B).

In S617, the system control unit 101 determines whether or not the up or down key of the directional key 80 has been pressed. The process advances to S618 in the case where it is determined that the up or down key has been pressed, and advances to S620 in the case where it is determined that the up or down key has not been pressed. In S618, the system control unit 101 resets the auto power off timer. Next, in S619, the system control unit 101 changes the value of the item in the highlighted position.

In S620, the system control unit 101 determines whether or not the SET key 90 has been pressed. The process advances to S621 in the case where it is determined that the SET key 90 has been pressed, and advances to S623 in the case where it is determined that the SET key 90 has not been pressed. In S621, the system control unit 101 resets the auto power off timer. In S622, the system control unit 101 returns the item at the highlighted position to an unchangeable state, and the process returns to S606. In S623, the system control unit 101 determines whether or not the auto power off timer has expired. The process advances to S624 in the case where it is determined that the auto power off timer has expired, and returns to S617 in the case where the timer has not expired.

In S624, the system control unit 101 restores the auto power off time to the setting saved in S602. In S625, the system control unit 101 turns the digital camera 100 off (the auto power off process) in response to the auto power off timer expiring (that is, in response to the set auto power off time elapsing without any operations being made).

As described thus far, according to the first embodiment, the auto power off is executed using the default or user-set auto power off time in the case where the date/time/area setting screen is not displayed. On the other hand, the auto power off time setting is extended while the date/time/area setting screen is displayed. This makes it possible to realize a highly-convenient electronic device that appropriately balances the date/time/area setting and the execution of the power saving function.

Although the present embodiment takes into consideration a time thought to be sufficient for the user to set the time and extends the setting of the auto power off time in the case where the auto power off time is set to four minutes or less (S601 and S603), the invention is not limited thereto. For example, a use case can be considered where, in the case where the user changes the time to a desired time (hours, minutes) and then confirms the setting while listening to a time signal, the seconds are changed to 0 and the time is confirmed after standing by for the desired time without making any operations in the state illustrated in FIG. 4C. At this time, it is possible that the user waits a maximum of 60 seconds until the next 0 seconds is reached, and that the power will be turned off by the auto power off while the user waits. Accordingly, in the case where the auto power off time is set to one minute or less in S601 and S603, the auto power off time may be set to a time longer than one minute. In other words, the auto power off time setting is extended in the case where the auto power off time is set to less than or equal to a predefined time that is greater than or equal to one minute.

Additionally, the aforementioned embodiment describes an example of an auto power off function, which turns the digital camera 100 off, as a power saving function (a function that reduces the amount of power consumed) executed on the basis of a time for which no operations are made. In other words, the embodiment describes an example in which the amount of time until the auto power off is executed is extended while the time setting screen is displayed; however, the invention is not limited thereto. Aside from the power saving function, there is a display-off function that turns off or dims the display in the display unit 111 while leaving the digital camera 100 turned on.

According to the display-off function, the display in the display unit 111 is turned off or dimmed when a set display-off time has elapsed without any operations being made. For the display-off time, the user can select and set a desired option from among 10 seconds, 20 seconds, 30 seconds, one minute, two minutes, and three minutes, for example. Here, the display-off function is executed in the case where the power is on, and thus cannot be set to a shorter amount of time than the auto power off time. Accordingly, the options that can be selected as the display-off time are shorter than the times set for the auto power off function. Additionally, the options for the display-off time, namely 10 seconds, 20 seconds, 30 seconds, one minute, two minutes, and three minutes, are shorter overall than the options for the auto power off time, namely one minute, two minutes, four minutes, eight minutes, 15 minutes, and 30 minutes. In other words, the average value of the options is shorter, or the option for the display-off time is shorter based on a comparison between the minimum values for the times and the maximum values for the times.

Like the above-described auto power off function, the display-off function also extends the display to an amount of time longer than a predefined amount of time in accordance with the time setting screen being displayed in the case where the display-off function is set to a predefined value or less. For example, setting the minute units while listening to a time signal as described above or watching the correct time display in another device can be considered. As such, in the case where the display-off time is one minute or less (10 seconds, 20 seconds, 30 seconds, or one minute), it is preferable to extend the display-off time to a time longer than one minute (two or more minutes). Alternatively, in the case where the display-off time is set to less than one minute (10 seconds, 20 seconds, or 30 seconds), the display-off time may be extended to one minute or more. Additionally, although the auto power off time is extended to six minutes while the date/time/area setting screen is being displayed in the present embodiment (S603), the auto power off may be set not to be executed. The same applies to the display-off function, and the display-off function may be set not to be executed.

Second Embodiment

Next, a second embodiment will be described. In the first embodiment, the setting of the auto power off time is extended when the date/time/area setting screen is displayed (S601 and S603), but the present invention is not limited thereto. In the second embodiment, the setting of the auto power off time is extended when the user's intent to change has been recognized, for example, the first time the user puts one of the date/time/area into the changeable state. The rest of the embodiment is the same as the first embodiment. For example, the setting of the auto power off time is extended in the case where a user operation for changing the time has been accepted after the time setting screen is displayed.

Figure 7A:
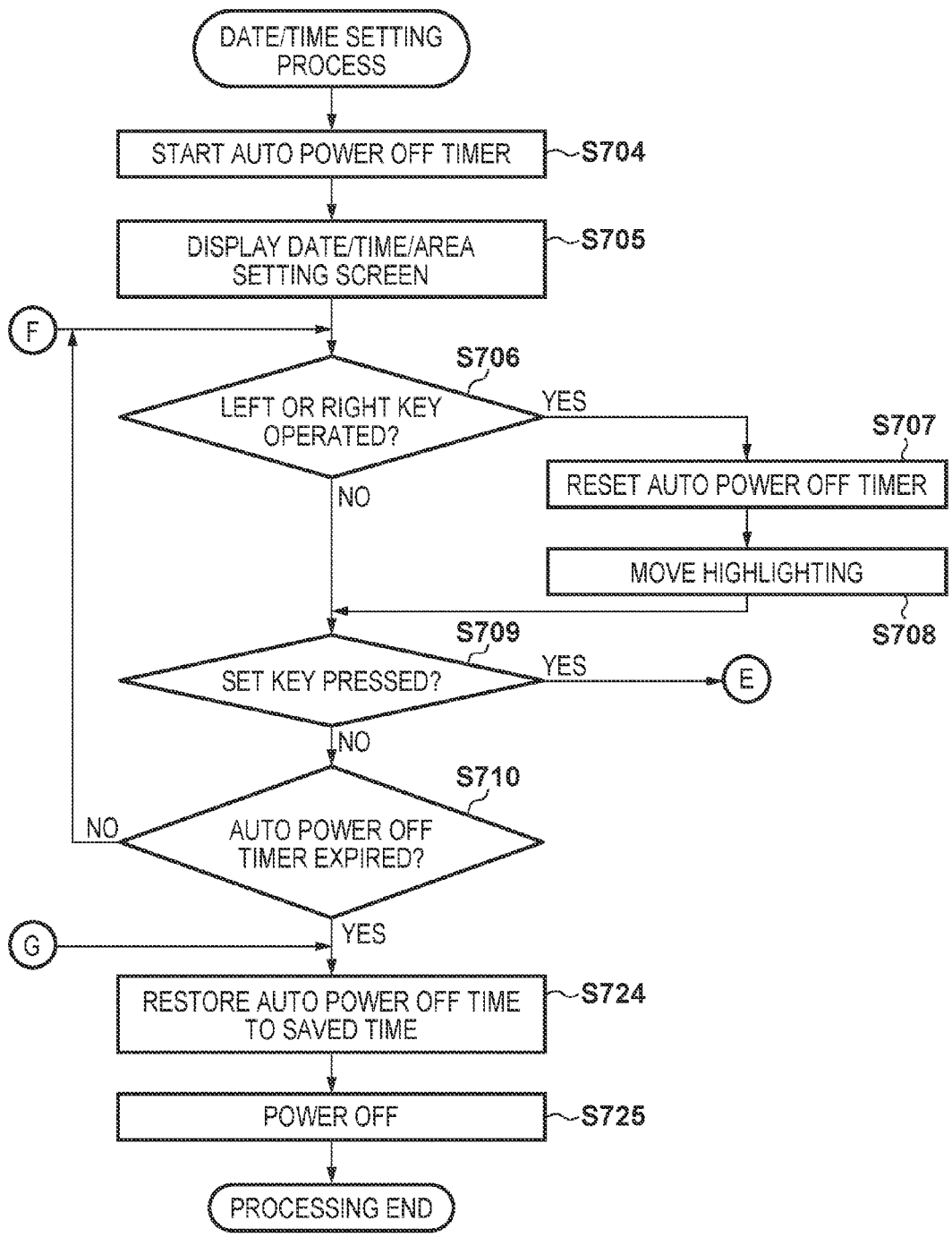

FIGS. 7A and 7B are flowcharts illustrating a date/time setting process according to the second embodiment. This is the specific date/time setting process executed in the aforementioned S513 of FIG. 5, and is realized by the system control unit 101 loading a program recorded in the nonvolatile memory 114 into the system memory 113 and executing the program.

S704 to S715 are the same processes as S604 to S615 in FIGS. 6A and 6B, and thus descriptions thereof will be omitted. In S731, the system control unit 101 determines whether or not the auto power off time is currently set to four minutes or less. The process advances to S732 in the case where the auto power off time is four minutes or less, and advances to S716 in the case where the auto power off time is more than four minutes. In S732, the system control unit 101 saves the auto power off time currently set in the system memory 113. In S733, the system control unit 101 sets the auto power off time to six minutes (extends the auto power off time). S716 to S725 are the same processes as S616 to S625 in FIGS. 6A and 6B, and thus descriptions thereof will be omitted.

As described thus far, according to the second embodiment, rather than immediately extending the auto power off time upon the date/time/area setting screen being displayed, the setting of the auto power off time is extended the first time one of the date/time/area are put into a changeable state. This makes it possible to shorten the period for which the setting of the auto power off time is extended, which in turn makes it possible to save more energy. It goes without saying that the same control can be carried out for the display-off function as well.

Note that the control performed by the system control unit 101 may be carried out by a single piece of hardware, or the control of the apparatus as a whole may be carried out by dividing the processing up among multiple pieces of hardware.

Although the foregoing has described preferred embodiments of the present invention, the present invention is not intended to be limited to the specific embodiments, and all variations that do not depart from the essential spirit of the invention are intended to be included in the scope of the present invention. Furthermore, the above-described embodiments are merely embodiments describing the present invention, and the embodiments can be combined as appropriate as well.

In addition, although the above-described embodiments describe examples in which the present invention is applied in a digital camera, the present invention is not limited to these examples. For example, the present invention can be applied in any electronic device as long as the electronic device has a clock function for which a time can be set, and an auto power off function and/or display-off function. In other words, the present invention can be applied in personal computers and PDAs, mobile telephone terminals and portable image viewers, digital photo frames, music players, game devices, e-book readers, and the like.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148033, filed Jul. 27, 2015, which is hereby incorporated by reference herein in its entirety.

What is claimed is:

1. An electronic device comprising:
one or more processors; and
at least one memory having stored thereon instructions that, when executed by the one or more processors, cause the electronic device to:
execute a power saving function that reduces an amount of consumed power in response to a non-operating period, in which there are no operations from a user, reaching a predefined amount of time;
display, in a display unit, a time setting screen for setting a current time, and set, to the electronic device, a current time set by a user through the time setting screen; and
carry out control such that the power saving function, when the time setting screen is not being displayed, is executed in response to the non-operating period reaching the predefined amount of time and an amount of time until the power saving function is executed is extended to be longer when the time setting screen is being displayed than when the time setting screen is not being displayed.

2. The electronic device according to claim 1, wherein the power saving function is an auto power off function that turns the electronic device off in response to the non-operating period reaching the predefined amount of time.

3. The electronic device according to claim 1,
wherein the power saving function is a display-off function that turns off or dims the display unit in response to the non-operating period reaching the predefined amount of time.

4. The electronic device according to claim 1,
wherein, in the display, the instructions, when executed by the one or more processors, further cause the electronic device to display the time setting screen automatically in the case where the electronic device is turned on in a state where the current time is not set.

5. The electronic device according to claim 1, wherein the instructions, when executed by the one or more processors, further cause the electronic device to:
set the predefined amount of time by a user operation, and
when the time setting screen is being displayed, carry out the extension in the case where the predefined amount of time is a specific amount of time or less, and not carry out the extension in the case where the predefined amount of time is longer than the specific amount of time.

6. The electronic device according to claim 5,
wherein in the extension, the instructions, when executed by the one or more processors, further cause the electronic device to change the predefined amount of time to the specific amount of time.

7. The electronic device according to claim 5,
wherein the specific amount of time is an amount of time of one minute or more.

8. The electronic device according to claim 1,
wherein the instructions, when executed by the one or more processors, further cause the electronic device to execute the extension in response to an operation for changing the current time being accepted after the time setting screen is displayed.

9. The electronic device according to claim 1,
wherein the instructions, when executed by the one or more processors, further cause the electronic device to restore the predefined amount of time to the time used before the extension in response to the display of the time setting screen ending.

10. The electronic device according to claim 1, further comprising:
an image capturing unit;
wherein the instructions, when executed by the one or more processors, further cause the electronic device to add an imaging date and time to an image captured by the image capturing unit on the basis of the current time.

11. The electronic device according to claim 1, wherein the instructions, when executed by the one or more processors, further cause the electronic device to, when a screen other than the time setting screen is being displayed, execute the power saving function in response to the non-operating period reaching the predefined amount of time.

12. An electronic device comprising:
one or more processors; and
at least one memory having stored thereon instructions that, when executed by the one or more processors, cause the electronic device to:
execute a power saving function that reduces an amount of consumed power in response to a non-operating period, in which there are no operations from a user, reaching a predefined amount of time;
display, in a display unit, a time setting screen for setting a current time, and set, to the electronic device, a current time set by a user through the time setting screen; and
carry out control such that the power saving function, when the time setting screen is not being displayed, is executed in response to the non-operating period reaching the predefined amount of time and the power saving function is not executed when the time setting screen is being displayed even in the case where the non-operating period has reached the predefined amount of time.

13. The electronic device according to claim 12, wherein the instructions, when executed by the one or more processors, further cause the electronic device to, when a screen other than the time setting screen is being displayed, execute the power saving function in response to the non-operating period reaching the predefined amount of time.

14. A method of controlling an electronic device, the method comprising:
executing a power saving function that reduces an amount of consumed power in response to a non-operating period, in which there are no operations from a user, reaching a predefined amount of time;
displaying a time setting screen for setting a current time in a display unit;
setting, to the electronic device, a current time set by a user through the time setting screen; and
carrying out control such that the power saving function, when the time setting screen is not being displayed, is executed in response to the non-operating period reaching the predefined amount of time and an amount of time until the power saving function is executed is extended to be longer when the time setting screen is being displayed than when the time setting screen is not being displayed.

15. A method of controlling an electronic device, the method comprising:
executing a power saving function that reduces an amount of consumed power in response to a non-operating period, in which there are no operations from a user, reaching a predefined amount of time;
displaying a time setting screen for setting a current time, in a display unit;
setting, to the electronic device, a current time set by a user through the time setting screen; and
carrying out control such that the power saving function, when the time setting screen is not being displayed, is executed in response to the non-operating period reaching the predefined amount of time and the power saving function is not executed when the time setting screen is being displayed even in the case where the non-operating period has reached the predefined amount of time.

16. A non-transitory computer-readable storage medium in which is stored a program for causing a computer to execute a method of controlling an electronic device, the method comprising:
executing a power saving function that reduces an amount of consumed power in response to a non-operating period, in which there are no operations from a user, reaching a predefined amount of time;
displaying a time setting screen for setting a current time in a display unit;
setting, to the electronic device, a current time set by a user through the time setting screen; and
carrying out control such that the power saving function, when the time setting screen is not being displayed, is executed in response to the non-operating period reaching the predefined amount of time and an amount of time until the power saving function is executed is extended to be longer when the time setting screen is being displayed than when the time setting screen is not being displayed.

* * * * *